(12) United States Patent
Brand et al.

(10) Patent No.: US 8,257,227 B2
(45) Date of Patent: *Sep. 4, 2012

(54) METHOD AND APPARATUS FOR DECELERATING A MATERIAL REDUCTION TOOL

(75) Inventors: Ivan R. Brand, Holland, MI (US); Brent Allen Bartels, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 12/182,020

(22) Filed: Jul. 29, 2008

(65) Prior Publication Data

US 2009/0036271 A1    Feb. 5, 2009

Related U.S. Application Data

(60) Provisional application No. 60/962,804, filed on Jul. 31, 2007.

(51) Int. Cl.
*B60K 26/02* (2006.01)

(52) U.S. Cl. ........................ 477/172; 477/173

(58) Field of Classification Search .................. 477/172, 477/173, 175, 178; 144/334, 382
See application file for complete search history.

(56) References Cited

U.S. PATENT DOCUMENTS

| | | | | |
|---|---|---|---|---|
| 1,447,908 A | * | 3/1923 | Staude | ........................ 477/172 |
| 4,117,651 A | * | 10/1978 | Martin, Jr. | ........................ 56/10.5 |
| 4,223,775 A | * | 9/1980 | Lloyd | ........................ 477/172 |
| 5,368,532 A | | 11/1994 | Farnet | |
| 5,620,077 A | * | 4/1997 | Richard | ........................ 192/12 D |
| 5,746,261 A | | 5/1998 | Bowling | |
| 5,801,340 A | | 9/1998 | Peter | |
| 5,847,690 A | | 12/1998 | Boie et al. | |
| 6,014,996 A | | 1/2000 | Egging et al. | |
| 6,026,871 A | | 2/2000 | Chapman | |
| 6,501,281 B1 | | 12/2002 | Rundo | |
| 6,590,171 B1 | | 7/2003 | Wolf et al. | |
| 7,154,393 B2 | | 12/2006 | Okushima et al. | |
| 7,795,882 B2 | | 9/2010 | Kirchner et al. | |

(Continued)

FOREIGN PATENT DOCUMENTS

EP    0 977 363 A2    2/2000

(Continued)

OTHER PUBLICATIONS

International Search Report and Written Opinion mailed Nov. 20, 2008.

(Continued)

*Primary Examiner* — Edwin A Young
(74) *Attorney, Agent, or Firm* — Merchant & Gould P.C.

(57) ABSTRACT

One embodiment of the present disclosure provides a material reduction machine including a clutch configured and arranged to engage and disengage a material reduction tool with an engine based in response to a control unit. The control unit is configured to decelerate the material reduction tool by maintaining the clutch engaged with the engine during an engine speed reduction period. Another embodiment of the present disclosure also provides a method of decelerating a material reduction tool of a material reduction machine. The method includes the steps of maintaining engagement between the material reduction tool and an engine after the engine enters an engine speed reduction mode, and disengaging the material reduction device from the engine before the engine rpm drops below a predetermined level.

21 Claims, 11 Drawing Sheets

U.S. PATENT DOCUMENTS

2009/0090434 A1* 4/2009 Brand et al. .................. 144/334

FOREIGN PATENT DOCUMENTS

| EP | 1 712 418 A2 | 10/2006 |
|---|---|---|
| GB | 2 005 422 A | 4/1979 |
| WO | WO 89/08352 | 9/1989 |

OTHER PUBLICATIONS

International Search Report and Written Opinion mailed Nov. 20, 2008 from International Application No. PCT/US2008/071628.

International Search Report and Written Opinion mailed Dec. 29, 2008 from International Application No. PCT/US2008/071613.

SC60TX Stump Cutter Operator's Manual, SC60TX_01_03, Order No. 105400V64, 92 pages, ©2004, Vermeer Manufacturing Company.

SC60TX Stump Cutter Operator's Manual, SC60TX_02_03, Order No. 105400Y38, 86 pages, ©2008, Vermeer Manufacturing Company.

SC60TX Stump Cutter Maintenance Manual, SC60TX_m1_01, Order No. 105400V66, 71 pages, ©2003, Vermeer Manufacturing Company.

SC60TX Stump Cutter Maintenance Manual, SC60TX_m2_03, Order No. 105400Y40, 82 pages, ©2006, 2007, Vermeer Manufacturing Company.

SC60TX Stump Cutter Parts Manual, SC60TX_P1_03, Order No. 105400ZDG, 155 pages, ©2004, Vermeer Manufacturing Company.

SC60TX Stump Cutter Parts Manual, SC60TX_P2.07, Order No. 105400ZHF, 138 pages, ©2006-2008, Vermeer Manufacturing Company.

* cited by examiner

METHOD AND APPARATUS FOR DECELERATING A MATERIAL REDUCTION TOOL

CROSS REFERENCES TO RELATED APPLICATIONS

This application claims the benefit of U.S. Provisional Application No. 60/962,804, filed Jul. 31, 2007, the disclosure of which is hereby incorporated by reference in its entirety.

FIELD OF THE INVENTION

The present invention relates generally to material reduction machines having material reduction tools and, more specifically, to an apparatus and method for automatically and quickly decelerating the material reduction tool based on a predetermined set of conditions.

BACKGROUND OF THE INVENTION

Material reduction machines such as stump cutting machines are well known. Such machines commonly include a rotating cutter wheel driven by a gas or diesel engine. In the case of a stump cutter, the cutter wheel, while rotating, is advanced toward the stump and moved laterally across the face of the stump. The cutter wheel is mounted at one end of a boom which is, in turn, pivotally mounted on a support frame. Hydraulic boom swing cylinders are used to pivot the boom about the pivot point to move the cutter wheel back and forth across the face of the stump to cut it away. The hydraulic boom swing cylinders are controlled by control lever handles. The handles may also provide an additional function, namely, determining operator presence.

Operator Presence Systems (OPS) are also known in the art. Typically, the systems include two main components: a sensor system activated by an operator when physically located at an operating station, and deactivated when the operator leaves the operating station; and a control system that disables a powered element of the machine when the sensor system is deactivated.

The operator station of a stump cutter often includes three hydraulic control levers that are operated by the individual standing on the ground. In this position, the operator is located in an area where the risk of being struck by a thrown object is minimized. During operation, the entire machine is advanced into the stump, thus requiring the operator to alter his/her standing position to remain comfortably in front of the controls. Job site conditions can also affect how the operator is positioned at the control area. In addition, to avoid fatigue while standing for potentially long periods of time, it is important that the operator be able to comfortably reposition his/her feet and stance. This configuration makes sensing the presence of an operator more difficult than in most machines where the operator is seated wherein operator absence can be detected by measuring the load on the seat.

Sensing the operator's presence at the control levers of a stump cutter is further complicated by the intermittent, and sometimes simultaneous, use of the three control levers. Additionally, operators routinely use gloves for protection from the weather or as protection for an operator's hands. The combined effect results in a situation where the option of utilizing levers with mechanical or electromechanical interlocks is not practical. These devices would require an operator to depress a button or switch while gripping the lever each time the operator moved from one control lever to another. Such a system also provides little freedom in repositioning the operator's hands on the levers. Accordingly, such a system would cause fatigue, result in frequent unwanted cutter wheel stoppages, hinder operation, and create control errors. Freedom of hand/finger position on the control levers is also very important to avoid hand fatigue. Such difficulties are likely to cause operator rejection and provide motivation for circumventing the system.

Therefore, there is a need in the art for an OPS for a stump cutter device that will not inhibit the operator's control of the stump cutter, will provide reliable operation, and can appropriately sense the operator's presence at the control levers without creating fatigue and operator discomfort.

In addition, the material reduction tools on such machines are often heavy and difficult to decelerate due to inertia of the moving tool. Braking systems that have been developed to decelerate the material reduction tool may have less than ideal breaking torque or long term reliability. There is a need in the art to provide a system that includes more effective, more efficient, and more reliable braking over thousands of cycles.

SUMMARY OF THE INVENTION

One embodiment of the present disclosure provides a material reduction machine including a clutch configured and arranged to engage and disengage a material reduction tool with an engine based in response to a control unit. The control unit is configured to decelerate the material reduction tool by maintaining the clutch engaged with the engine during an engine speed reduction period. Another embodiment of the present disclosure also provides a method of decelerating a material reduction tool of a material reduction machine. The method includes the steps of maintaining engagement between the material reduction tool and an engine after the engine enters an engine speed reduction mode, and disengaging the material reduction device from the engine before the engine rpm drops below a predetermined level.

While the invention will be described with respect to preferred embodiment configurations and with respect to particular devices used therein, it will be understood that the invention is not to be construed as limited in any manner by either such configurations or components described herein. While the example of a stump cutter type device is provided herein, the principles of this invention extend to any environment in which operator presence and/or detection is desired. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof, and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION OF THE PREFERRED EMBODIMENT

The principles of the present invention apply particularly well to its application in a stump cutter device environment. However, other environments in which operator presence and/or detection is desired may also employ the principles of this invention.

Figure 1:
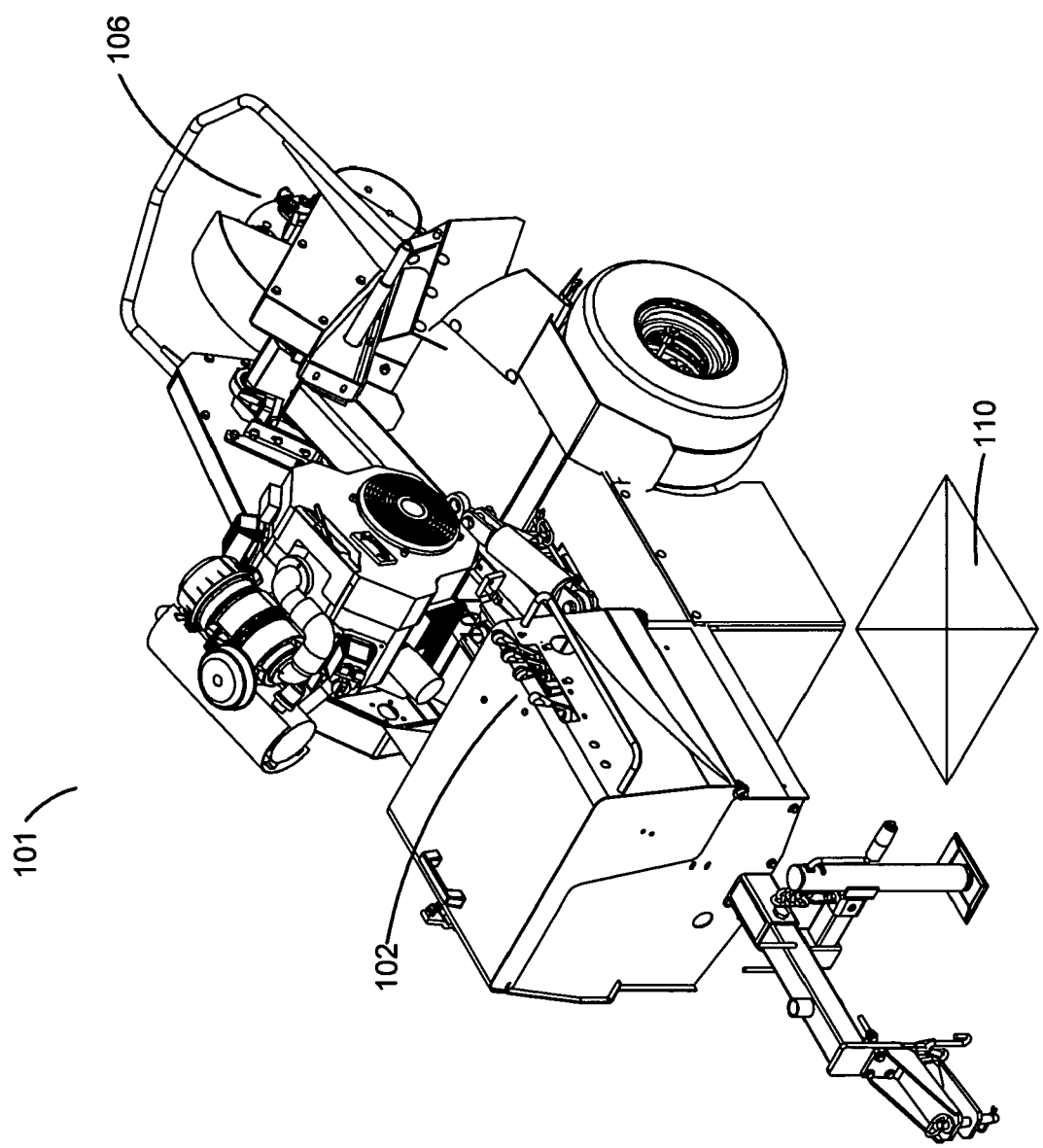
FIG. 1 is an isometric view of a stump cutter machine indicating the location of the operator station, the area where the operator stands, and the cutter wheel.
Figure 2:
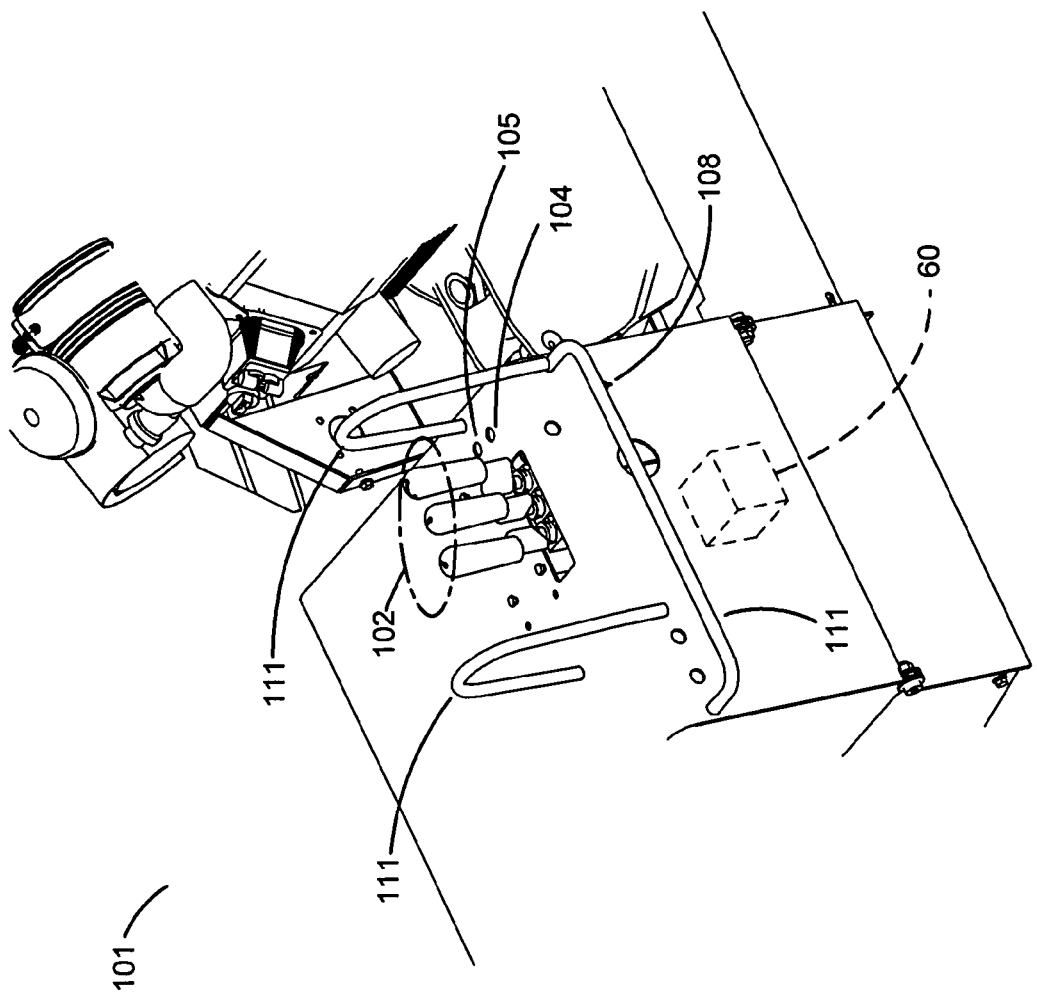
FIG. 2 is a close-up isometric view of the operator station 102 area.

With reference to FIGS. 1-2, an embodiment of the present disclosure applies capacitive sensing technology to a material reduction device such as a stump grinder 101, or other machine where operator presence may be useful or required, in order to sense when the operator is not present at the control station 102. If this condition is sensed, a controller issues a signal to stop the material reduction tool (e.g., grinding disk 106 (comprising a cutter wheel—or other powered device in alternative equipment)).

In the preferred embodiment, after the controller determines that the operator is not present at the control station 102, it then waits a predetermined period of time to see if the operator returns to the control station 102 before issuing the signal to stop the grinding disk 106. This period of time is referred to herein as a "delay period." The delay period allows an operator to move his hands between the handles 21, 50, 51 (e.g., to operate the equipment in its intended manner) without triggering the signal to stop the grinding disk 106.

According to the depicted embodiment of the present disclosure the control system includes several components. First, capacitance sensors are incorporated into the control handles 21, 50, 51 located at the operator station 102. The area designated 110 illustrates that area in which the operator would normally stand while attending to the controls located at the operator station 102. Second, a sensing circuit is used to generate a signal and measure changes in capacitance of the control handles 21, 50, 51. The measurement output of the sensing circuit is provided to the controller 60.

In the depicted embodiment, the sensing circuit may reside on the same circuit board as the controller 60, and so the signals from the handles may be provided over appropriate wiring or cables to the sensing circuit and then provided to the controller 60. The sensing circuit may alternatively be provided on a separate board with the outputs provided to the controller 60 board (or module). The controller 60 also has inputs for the grinding disk engage switch 65 and an engine rpm sensor 67, material reduction tool speed sensor 151, as well as outputs for the grinding disk engage relay or solenoid 62, the LED operator presence indicator, and the LED clutch engage indicator. The controller 60 preferably includes both hardware and software arranged and configured to control the operation of the machine based on the inputs. It will be appreciated, however, that other additional diagnostic display capability may be provided.

Since the controller 60 needs electrical input from the grinding disk 106 clutch engage switch 65 (shown as the actual switch in FIG. 2 by the number designation 108), it is desirable that the clutch 61 be an electrical PTO type clutch/brake. This type of device engages the clutch 61 when energized with an electrical actuator and allows a spring to engage a brake 70 when not energized. Thus, the clutch 61 is electrically engaged/spring disengaged, while the brake 70 is electrically disengaged/spring engaged. An example of a commercially available electrical PTO clutch/brake of the type described is manufactured by Ogura Industrial Corporation.

As noted above, in the preferred embodiment there are three hydraulic control handles 21, 50, and 51, each having one or more capacitive sensors incorporated therein. Each of the sensors may have an equal or differing predetermined fixed delay period to allow an operator to move between the sensors. Further, equal or differing delay periods may be employed for each of the sensors (e.g., depending on the last sensor touched by the operator) for the clutch 61 to reengage if an operator contacts a sensor before the delay period expires. This delay periods may also be of variable duration (i.e., longer when the grinding disk 106 speed is high, and shorter when the grinding disk 106 speed is low).

Figure 3:
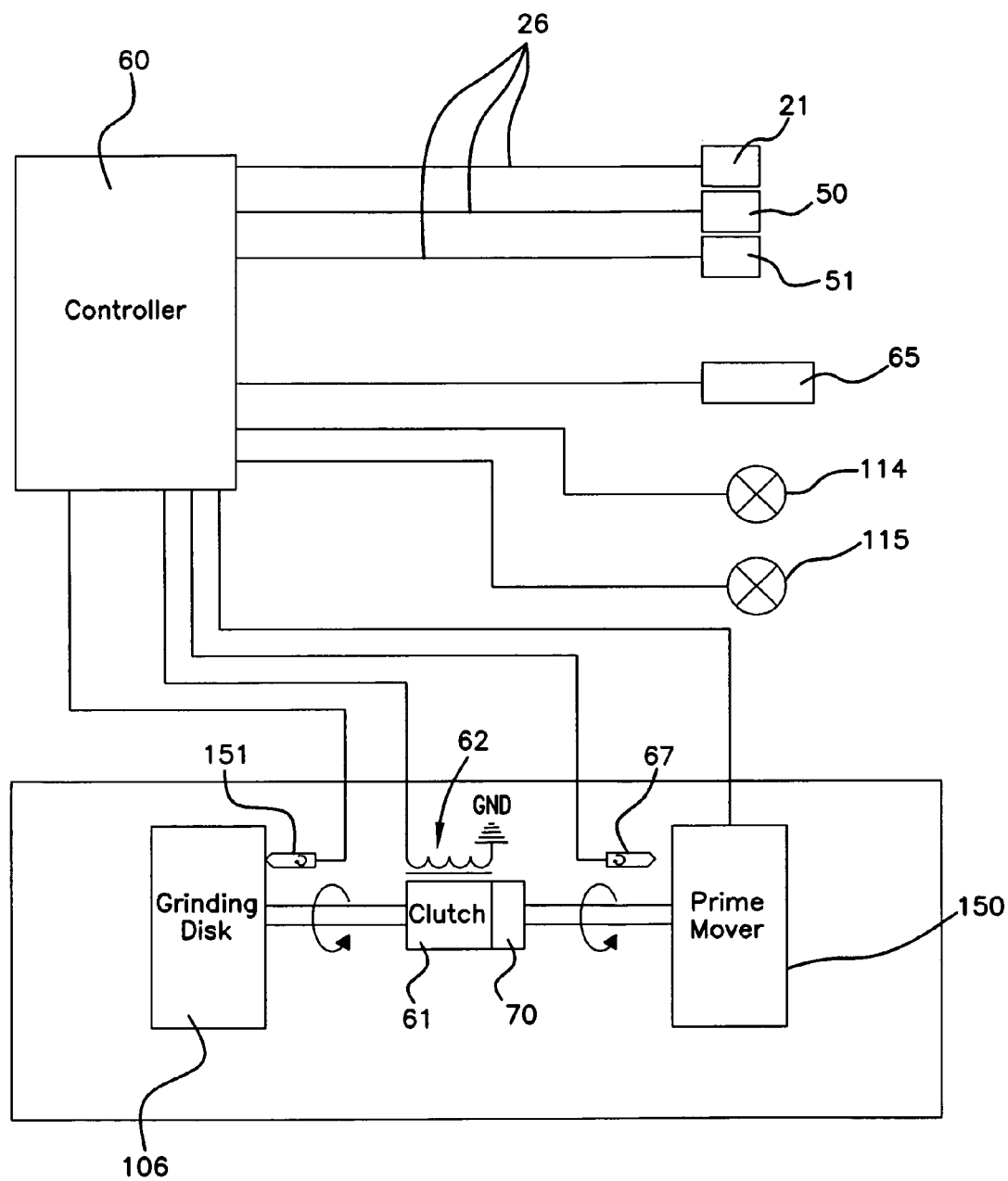
FIG. 3 is a schematic representation of the control system including the handles.

FIG. 3 illustrates the three handles 21, 50, and 51 (each having the internal sensor and electrode described above) connected to controller 60. Other various inputs and outputs for the stump cutter are connected to controller 60 as well. The outputs include connections to the clutch relay 62, clutch light 114, and clutch switch 65. As noted above, when an operator is no longer sensed, the controller de-energizes the clutch relay 62. This in turn opens the clutch 61 so that the grinding disk 106 is not turned by the prime mover 150 (also referred to herein interchangeably as a motor or engine), where the motor 150 may be, for example, a gas or diesel engine. Additionally, a brake 70 may be engaged to stop the grinding disk 106. Clutch light 114 may provide visual indication to an operator on the status of the clutch 61. Those skilled in the art will appreciate that additional diagnostic display capability 115 may also be provided. The speed of the grinding disk 106 may be determined by a grinding disk pickup 151 or may be inferred by an engine pickup 67.

As described above, the motor 150 may drive the grinding disk 106 directly via a clutch 61. Alternatively, a hydrostatic system may be employed wherein the engine 150 hydrostatically drives a hydraulic pump or motor (not shown) to drive the grinding disk 106. The grinding disk 106 may be connected to the hydraulic pump or motor via a chain, shaft, or other suitable drive member. In such instance, the clutch 61 is operatively connected to the output of the hydraulic pump or motor (or the input to the grinding disk 106) in a suitable manner in order to disconnect the input power.

For a more detailed description of example handles or controllers filed on Jul. 29, 2008 titled METHOD AND APPARATUS FOR CONTROLLING THE OPERATION OF A STUMP CUTTER which is pending U.S. patent application Ser. No. 12/182,025, and filed on Jul. 29, 2008 titled APPARATUS AND METHOD OF CAPACITIVELY SENSING OPERATOR PRESENCE FOR A STUMP CUTTER which issued as U.S. Pat. No. 7,999,562 on Aug. 16, 2011, both of which are incorporated by reference in their entirety herein.

Figure 4:
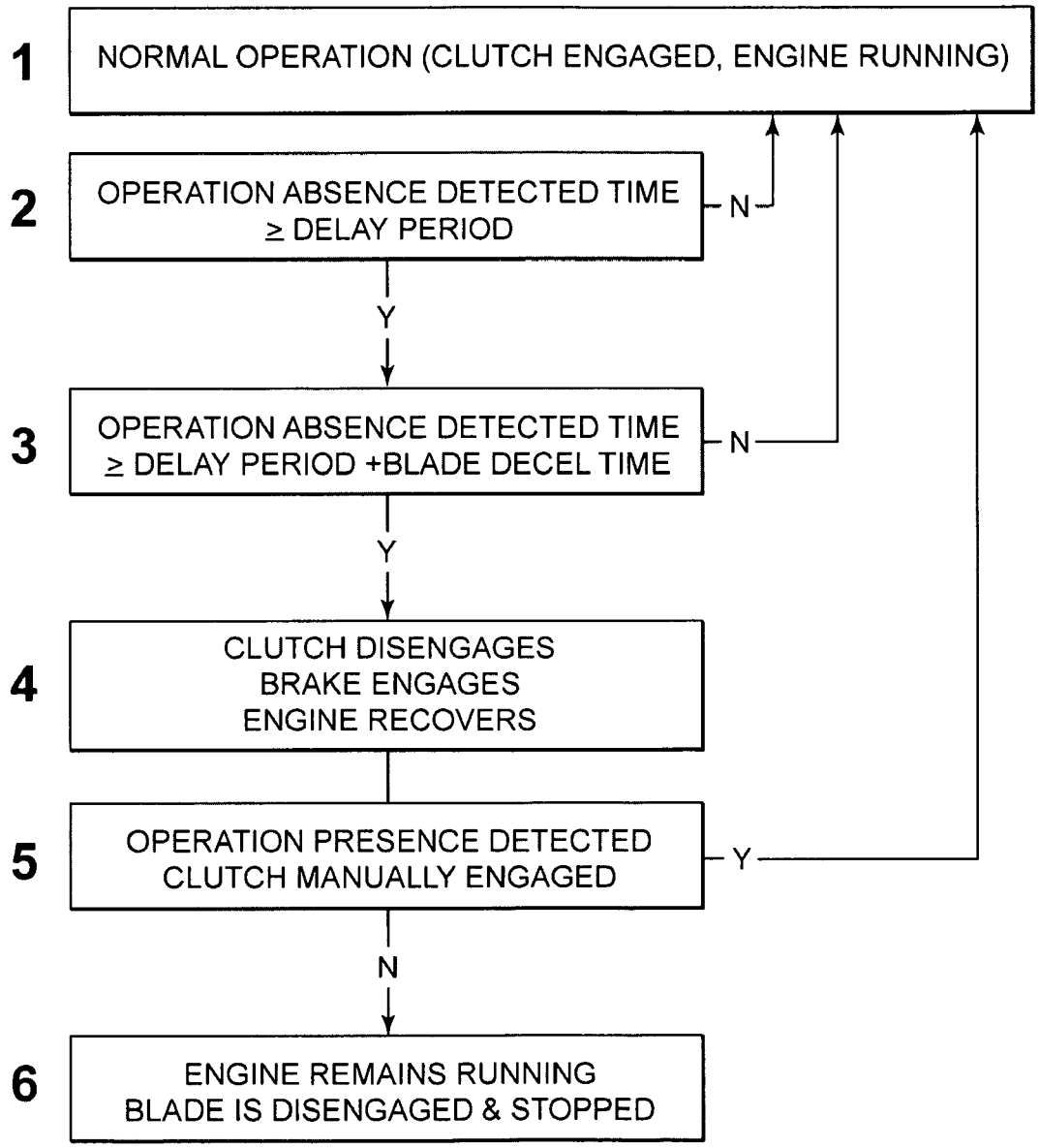
FIG. 4 is a flow chart illustrating the control sequence of an embodiment of the present disclosure.

Referring to FIG. 4 an embodiment of the material reduction tool deceleration method according to the present disclosure is shown. In the depicted embodiment the normal operation refers to the state in which the clutch is engaged with the engine and the material reduction tool is running at operating speed. If the sensors detect that the operator is absent for a period of time greater than the delay period, the engine goes into an engine speed reduction mode. If the period of time that the operator is detected as being absent is less than the delay period, the machine continues normal operations uninterrupted.

In the speed reduction mode the engine speed is decreased. For example, the engine speed can be slowed to an idle speed by decreasing the flow of fuel to the engine. Alternatively the engine can be disabled (e.g., fuel to a diesel engine is blocked, or the electrical current or fuel to a gas engine is stopped). According to the depicted embodiment, during the engine speed reduction mode the clutch remains engaged to decelerate the material reduction tool (i.e., the engine is used to brake the material reduction tool). According to the depicted embodiment, the engine speed reduction mode duration is limited so to prevent the engine from slowing to a point beyond automatic recovery. In other words, the engine speed reduction mode duration is limited to prevent the need to manually restart the engine. In one embodiment, where the engine is not disabled during the engine speed reduction mode (i.e., the engine is still on), the duration of the engine speed reduction mode can be limited by the speed of the reduction tool. The actual duration of the engine speed reduction mode can vary based on the engine speed during normal operations as well as many other factors. For example, in some embodiments the engine speed reduction period is between 0.1 to 10.0 seconds. In another embodiment the period is between 0.1 to 2.0 seconds. It should be appreciated that many other alternative periods are possible as well.

If the period of time that the operator is detected as being absent is less than the delay period plus the engine speed reduction mode time, the engine recovers and the material reduction tool is accelerated as the engine recovers. As discussed above, the clutch is engaged during the engine speed reduction mode. If the period of time that the operator is detected as being absent is greater than or equal to the delay period plus the engine speed reduction mode time the clutch is disengaged, the brake is engaged, and the engine recovers to operational speed. It should be appreciated that in some alternative embodiments the engine completely shuts off at this step, and in other embodiments the engine does not recover to operational speeds but instead to an idle speed.

If at some time after the engine speed reduction mode the operator's presence is detected and the operator manually reengages the clutch (e.g., toggles the clutch switch), the clutch will reengage and the material reduction tool will accelerate. If either the operator presence remains undetected or the clutch is not manually reengaged, the material reduction tool remains stopped with the clutch disengaged. It should be appreciated that although material reduction tool is referenced in FIG. 4 as a blade, it can take many other forms as well (e.g., cutting wheel, grinding device, cutting chain, cutting disk, etc.).

Figure 5:
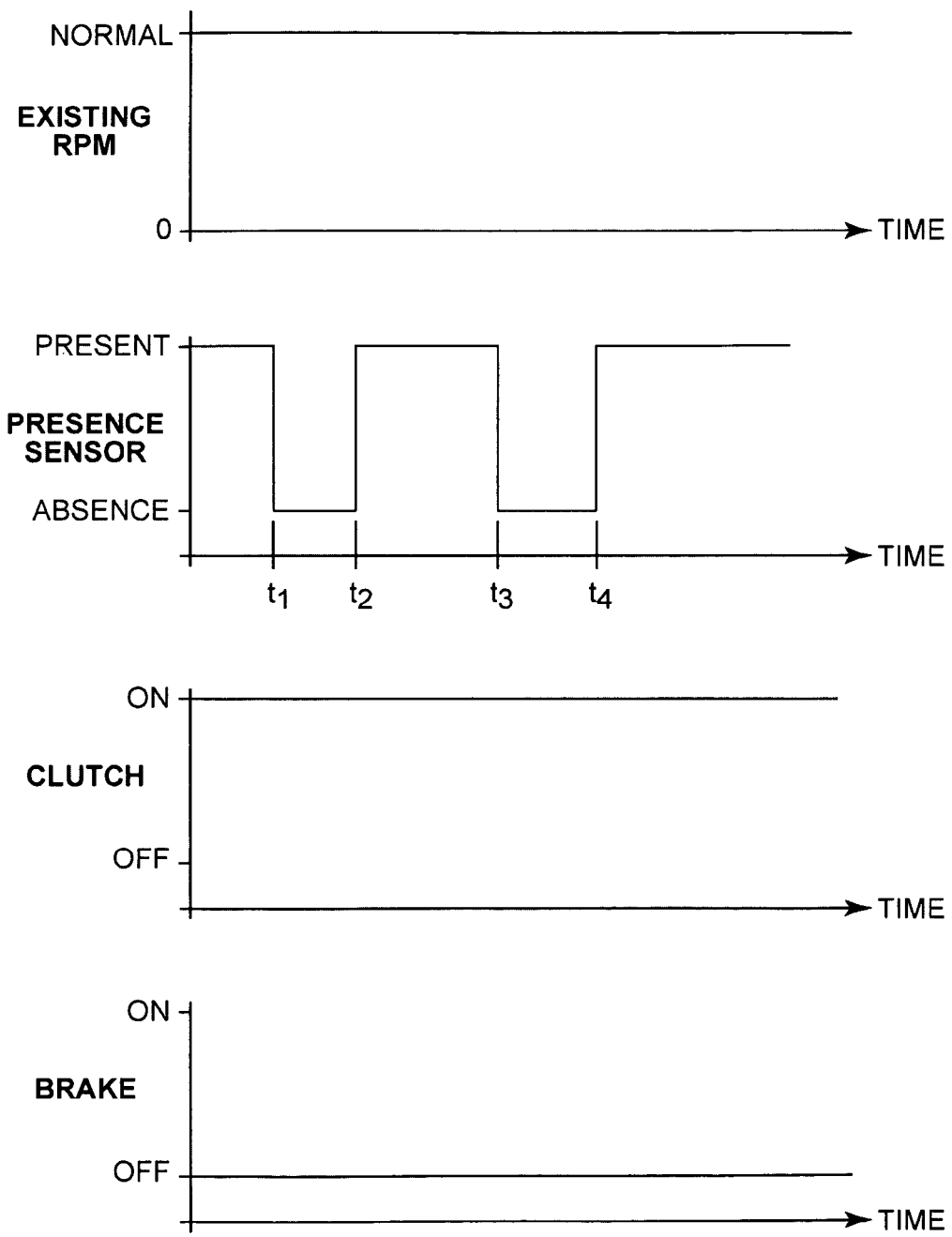
FIG. 5 is an illustration of the machine response according to an embodiment of the present disclosure wherein an operator's absence is detected, but the duration of the detected absence is less than the delay period.

Referring to FIGS. 5-11, various scenarios are shown along with the machine response to further illustrate the system and method of the present disclosure. Referring to FIG. 5, the operator absence is detected between times t1 and t2 and also between times t3 and t4. Both of the time intervals are less than the predetermined delay period, so the machine response is to maintain normal operations. The engine rpm remains at a normal level, the clutch remains engaged, and the brake remains off.

Figure 6:
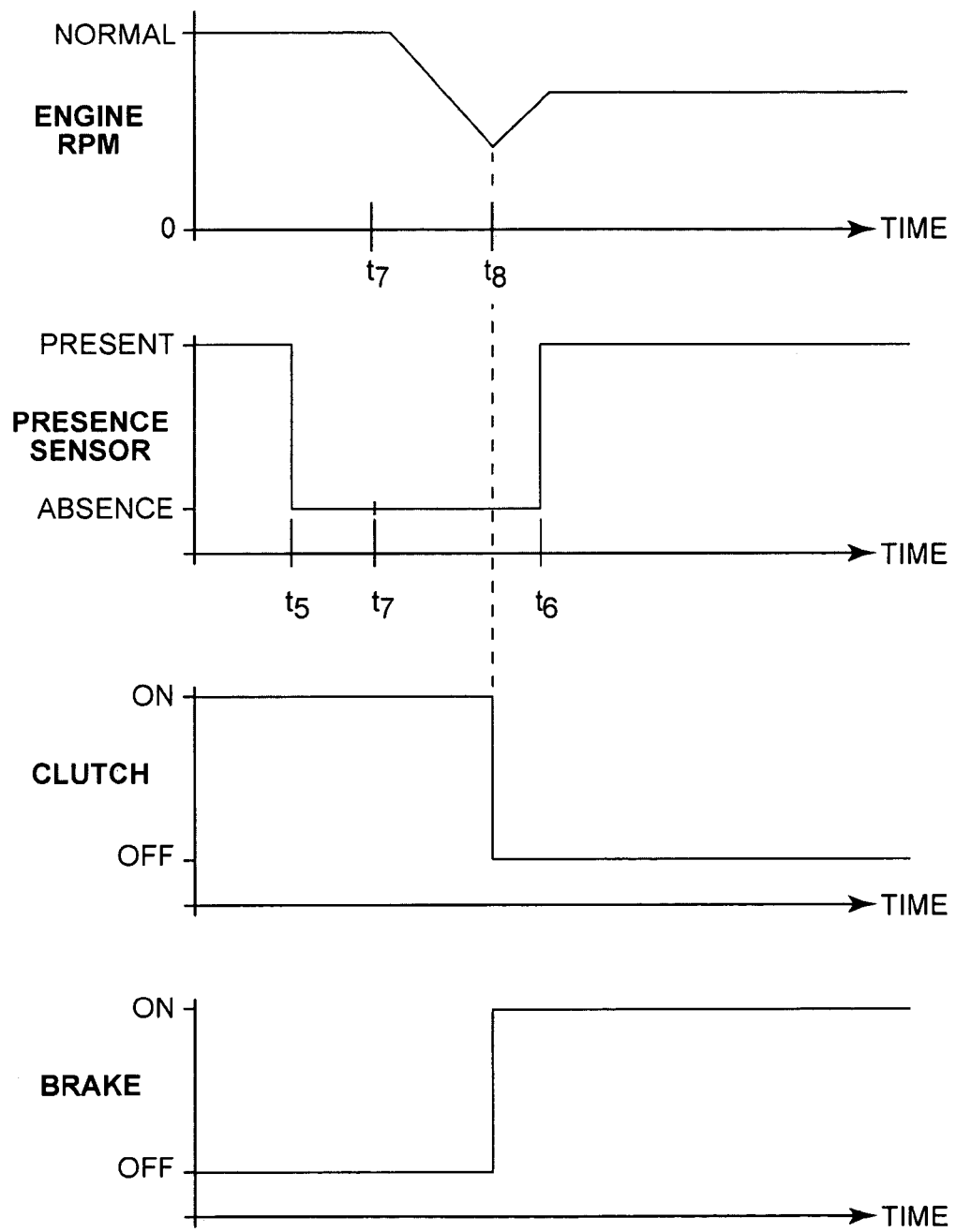
FIG. 6 is an illustration of the machine response according to an embodiment of the present disclosure wherein an operator's absence is detected and the duration of the detected absence is longer than the delay period plus the engine speed reduction mode duration.

Referring to FIG. 6, the operator absence is detected between times t5 and t6. In the depicted scenario the time intervals are greater than the predetermined delay period and the engine speed reduction mode period. The delay period is illustrated as the interval between t5 and t7, and the engine speed reduction mode period is illustrated as the interval between t7 and t8. At time t8 the clutch disengages, the brake engages, the engine recovers. In the depicted embodiment the engine recovers to a speed that is less than the original operating speed (e.g., an idle speed). In alternative embodiments, the engine could recover to a different speed or, alternatively, be shut down completely.

Figure 7:
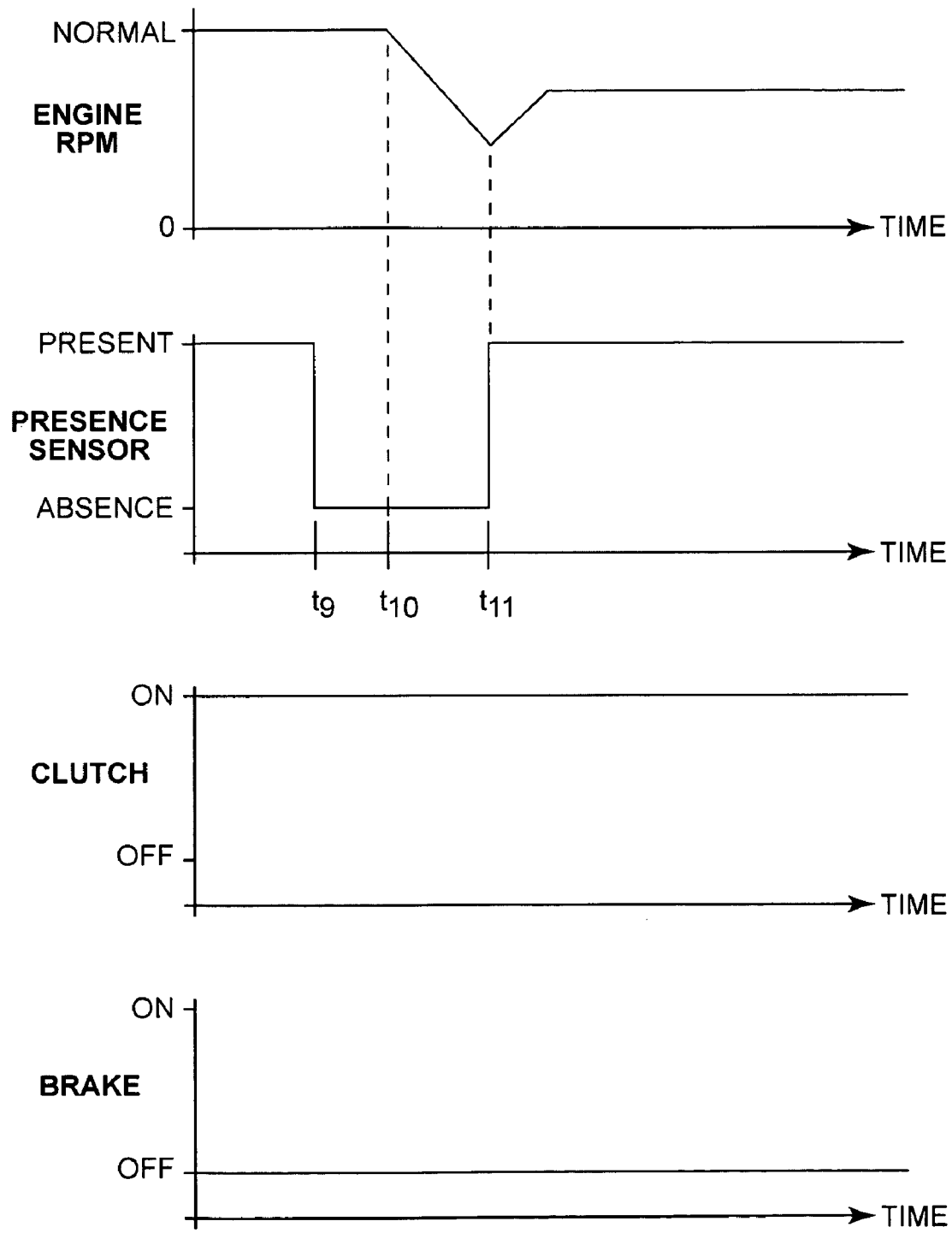
FIG. 7 is an illustration of a machine response according to an embodiment of the present disclosure wherein an operator's absence is detected and the duration of the detected absence is greater than the delay period but less than the sum of the delay period plus the engine speed reduction mode duration.

Referring to FIG. 7, the operator absence is detected between times t9 and t11. In the depicted scenario the time intervals are greater than the predetermined delay period but less than the delay period plus the engine speed reduction mode period. The delay period is illustrated as the interval between t9 and t10. At time t11, which is sometime during the engine speed reduction mode, the presence of an operator is detected. This triggers the engine to recover and accelerates the material reduction device. In this scenario the clutch remains engaged and the brake remains disengaged.

Figure 8:
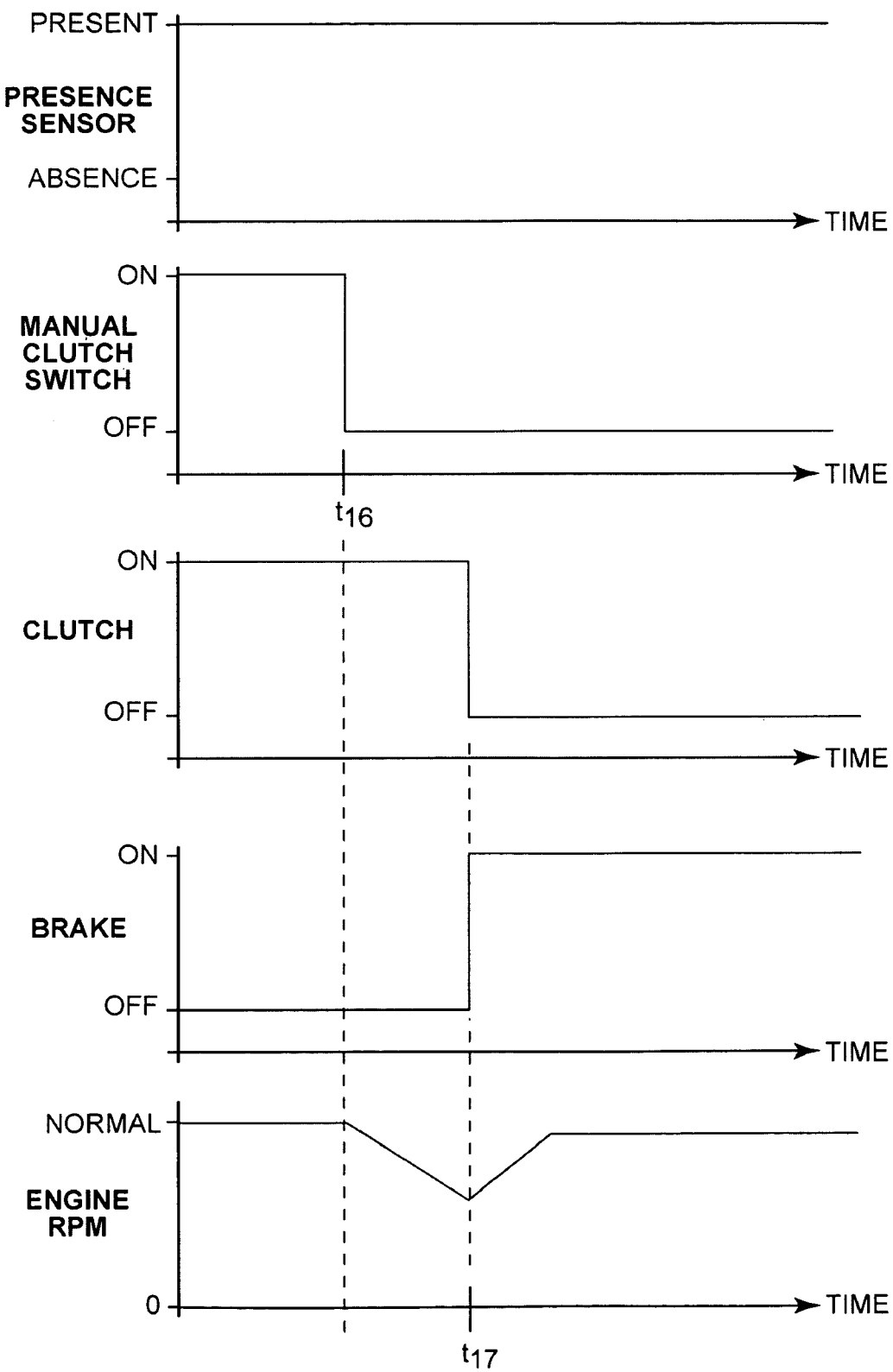
FIG. 8 is an illustration of a machine response according to an embodiment of the present disclosure wherein an operator's absence is not detected but the manual clutch switch is activated by the operator.

Referring to FIGS. 8-11, additional scenarios are described with reference to the operator controlled clutch engagement and disengagement switch, also referred to as the manual clutch switch. Referring to FIG. 8, the operator absence is not detected. At time t16 the manual clutch switch is activated by the operator, directing the machine to disengage the clutch. In the depicted embodiment the clutch remains engaged until time t17. During the interval between time t16 and t17, the engine decelerates the material reduction tool. At time t17, the engine recovers, the clutch disengages, and the brake engages. In the depicted embodiment, at time t17 the material reduction tool is still moving. In some embodiments the interval between t16 and t17 is pre set base on experimental data. On other embodiments the interval is dependant on the speed of the material reduction tool and/or the speed of the engine. In some embodiments it is desirable to keep the clutch engaged at least to decelerate the material reduction tool to a certain speed so long as the engine speed does not drop below a certain speed. For example, in some embodiments the material reduction device is configured to use engine braking to slow the cutter wheel to less than a predetermined value so long as the engine speed does not drop below an automatic restart speed (i.e., a speed at which the engine can be restarted without activating a starter motor).

Figure 9:
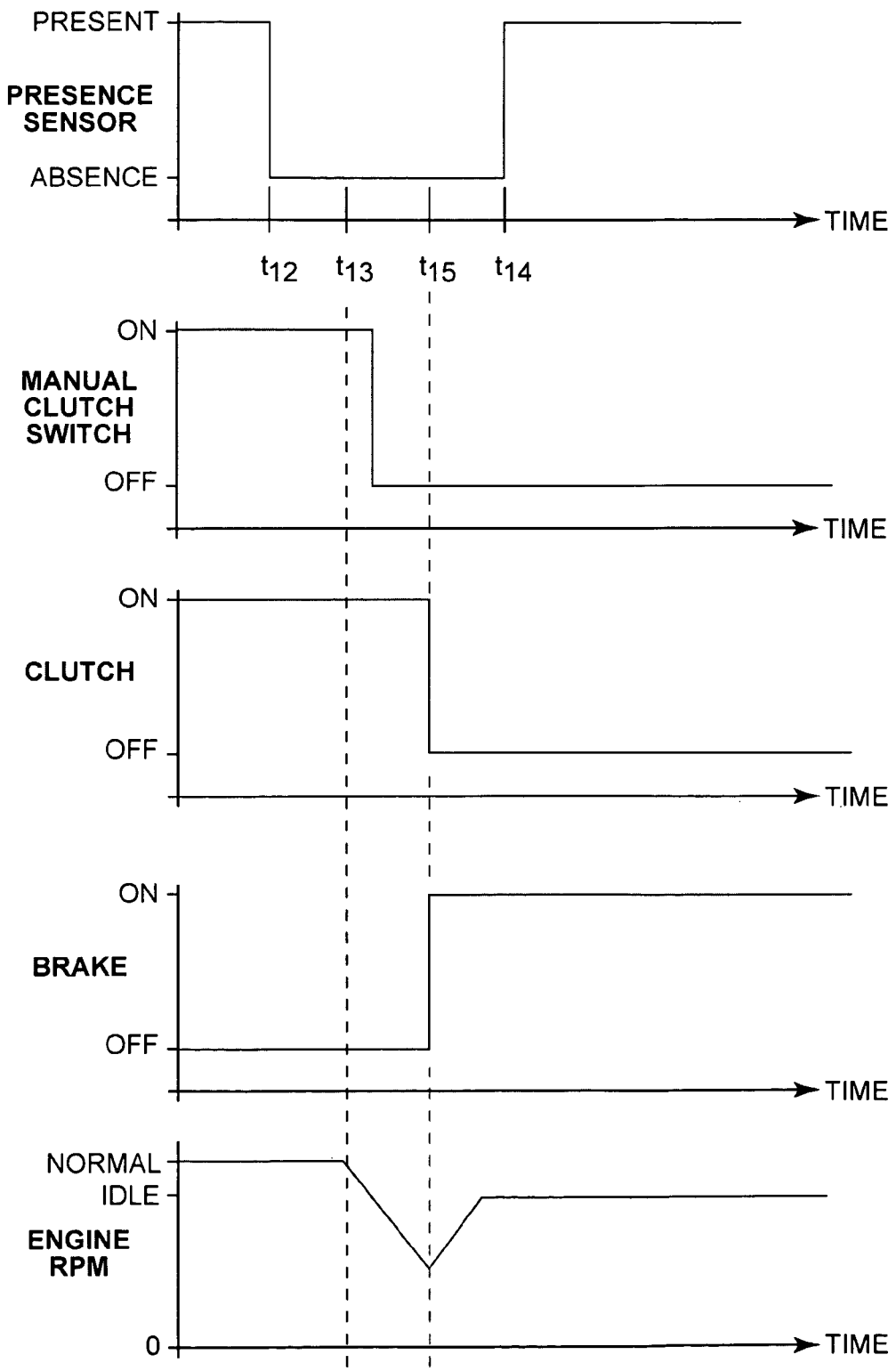
FIG. 9 is an illustration of a machine response according to an embodiment of the present disclosure wherein an operator's absence is detected and the manual clutch switch is activated by the operator during the engine speed reduction mode.

Referring to FIG. 9, the operator absence is detected between times t12 and t14. In the depicted scenario the time intervals are greater than the predetermined delay period (t12 to t13) plus the engine speed reduction mode period (t13-t15). At some time during the engine speed reduction mode (between t13 and t15), the operator activates the manual clutch switch, changing its state from on to off. Under these conditions the clutch remains engaged until the end of the engine speed reduction period t15. Subsequently, the clutch disengages, the brake engages, and the engine recovers. This illustrates that according to the depicted embodiment, the manual clutch switch does not override the engine speed reduction mode function when an operator absence is sensed. It should be appreciated, that many alternative control sequences are also possible.

Figure 10:
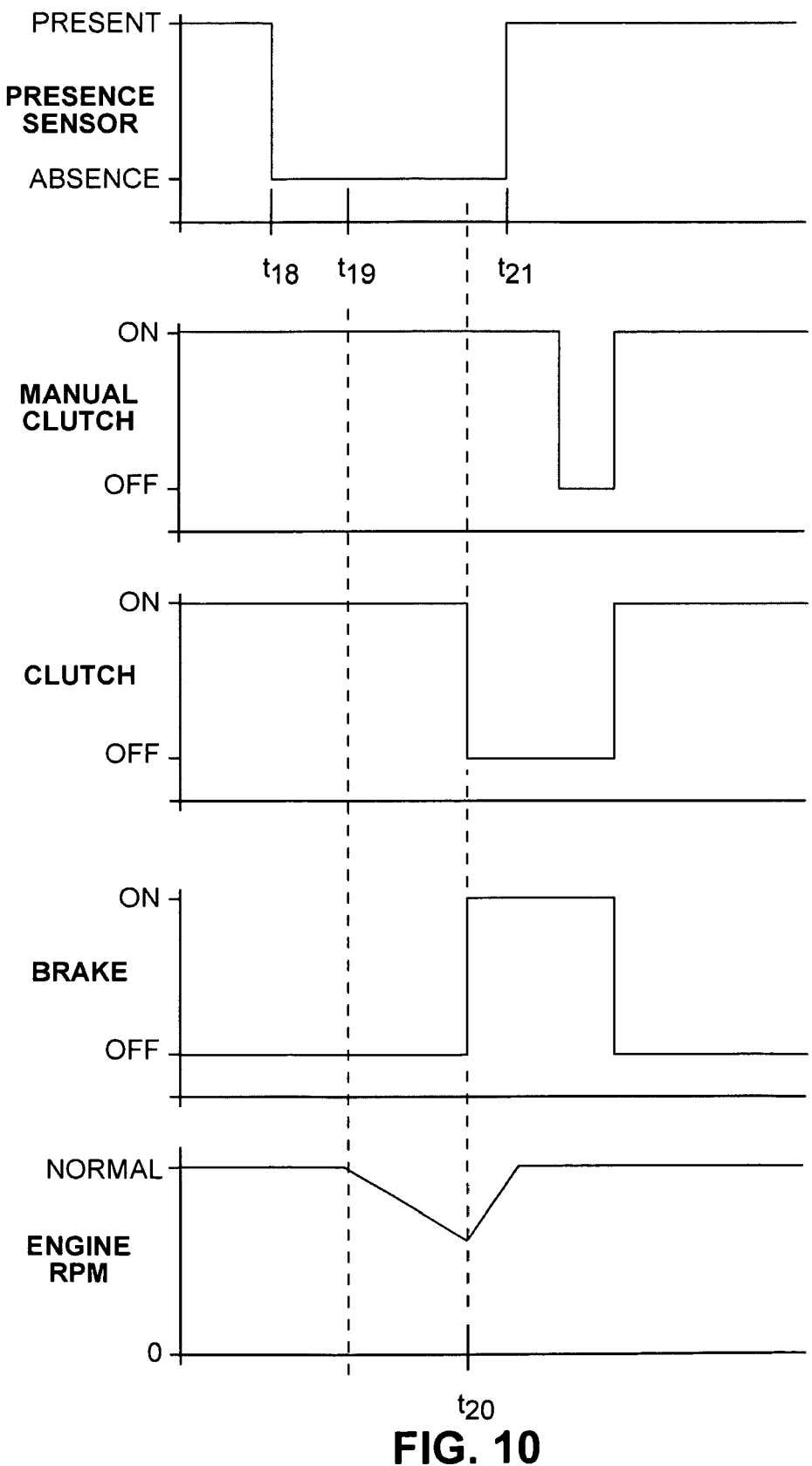
FIG. 10 is an illustration of the machine response according to an embodiment of the present disclosure wherein an operator's absence is detected and the duration of the detected absence is longer than the delay period plus the engine speed reduction mode duration and the manual clutch switch is subsequently activated by the operator.

Referring to FIG. 10, the operator absence is detected between times t18 and t21. In the depicted scenario the time intervals are greater than the predetermined delay period (t18 to t19) plus the engine speed reduction mode period (t19-t20). In this sequence the manual clutch switch is in the on state until sometime after the engine speed reduction mode automatically disengages the clutch and engages the brake. Under these conditions the clutch remains disengaged until the manual clutch switch is toggled during a period when the presence of an operator is sensed. In the depicted embodiment the engine speed reduction mode ends at time t20 and automatically disengages the clutch and engages the brake. In the depicted embodiment the brake is shown to be engaged as soon as the clutch is engaged. In some embodiments the clutch and brake are configured so that activating one deactivates the other automatically. It should be appreciated that in other embodiments disengaging the clutch does not automatically activate the brake and that there can be times where neither or both could be activated.

Figure 11:
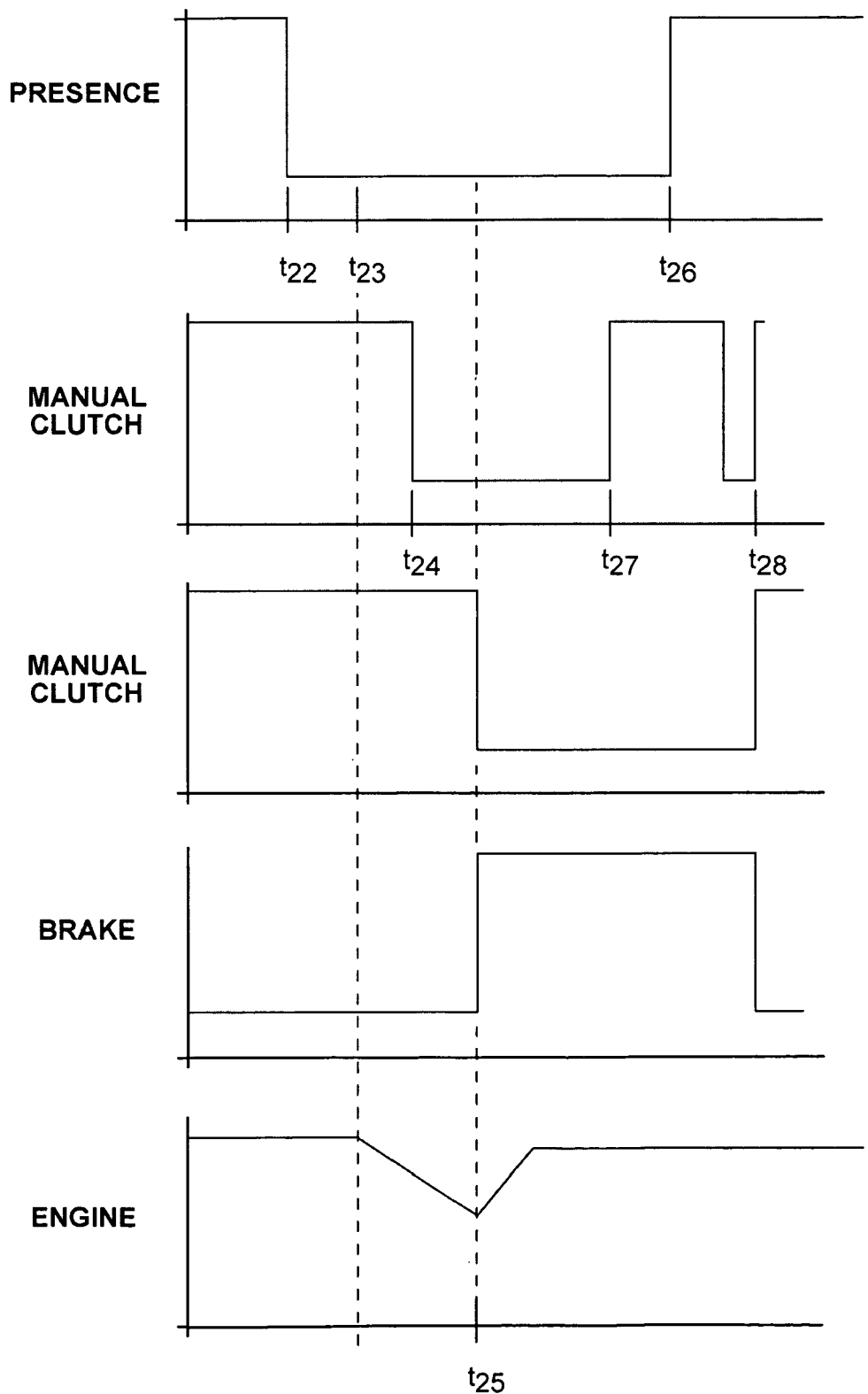
FIG. 11 is an illustration of a machine response according to an embodiment of the present disclosure wherein an operator's absence is detected and the duration of the detected absence is greater than the delay period but less than the sum of the delay period plus the engine speed reduction mode duration and the manual clutch switch is activated by the operator during the speed reduction mode duration.

Referring to FIG. 11, the operator absence is detected between times t22 and t26. In the depicted scenario the time intervals are greater than the predetermined delay period (t22 to t23) plus the engine speed reduction mode period (t23-t25). In this sequence the manual clutch switch is in the on state until sometime during the engine speed reduction mode. At the end of the speed reduction mode t25, the clutch automatically disengages, the brake automatically engages, and the engine recovers.

Subsequently, at time t27 the manual clutch switch is activated, but at t27 time the presence of an operator is not sensed. Therefore, at t27 the clutch remains disengaged. Once the operator presence is sensed at t26 the clutch still remains disengaged. The clutch engages and the brake disengages at t28 when the manual clutch switch is toggled and during a time when the operator presence is sensed. It should be appreciated that many other different clutch activation and clutch deactivation sequences are also possible.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

We claim:

1. A material reduction machine comprising:
   an engine;
   a material reduction tool;
   a clutch configured and arranged to engage and disengage the material reduction tool with the engine; and
   a control unit configured to control when the clutch disengages the material reduction tool based, at least in part, on a control signal received from a sensor that detects the presence of an operator;
   wherein the control unit is configured to decelerate the material reduction tool by maintaining the clutch engaged with the engine during an engine speed reduction period, wherein the engine speed reduction period is sufficiently short as to enable the engine to recover without requiring manually restarting.

2. The machine of claim 1, further comprising a brake that is configured to be engaged whenever the clutch is disengaged.

3. The machine of claim 1, wherein the controller monitors the engine speed.

4. The machine of claim 1, wherein the engine speed reduction period of time is between 0.1 to 10.0 seconds.

5. The machine of claim 4, wherein the engine speed reduction period of time is between 0.1 to 2.0 seconds.

6. The machine of claim 1, wherein the engine is disabled during the engine speed reduction period by stopping electrical current flow to the engine.

7. The machine of claim 1, wherein the engine is disabled during the engine speed reduction period by stopping fuel delivery to the engine.

8. The machine of claim 1, further comprising a user control clutch switch, wherein the control unit is configured such that changing the state of the user controlled clutch switch during the engine speed reduction period does not cause the clutch to be engaged or disengaged.

9. The machine of claim 1, wherein the engine recovers after the engine speed reduction period and the clutch is automatically disengaged.

10. A method of decelerating a material reduction tool of a material reduction machine comprising:
    maintaining engagement between the material reduction tool and an engine of the material reduction machine after the engine enters an engine speed reduction mode based on the sensed absence of an operator; and
    disengaging the material reduction device from the engine after a period of time to prevent the engine rpm from dropping below a predetermined level.

11. The method of claim 10, wherein the predetermined rpm level is sufficient to restart the engine without activating a starter motor.

12. The method of claim 10, further comprising the step of monitoring the speed of the material reduction tool and the engine during the engine speed reduction mode.

13. The method of claim 12, wherein the engine speed reduction mode terminates when the speed of the material reduction tool or the engine drops below a predetermined level.

14. A controller system for a material reduction machine having at least two operator control handles, comprising:
    (a) a capacitive sensor mounted in each of the handles, the capacitive sensor arranged and configured to change capacitance when the respective handle is touched by an operator;
    (b) an operator presence circuit connected to the capacitive sensors, the circuit configured such that changes in capacitance of the capacitive sensors can be measured as a change in voltage; and
    (c) a controller connected to the operator presence circuit, the controller receiving the changes in voltage from the operator presence circuit, and wherein the controller initiates a predetermined delay period when the voltage change indicates that the handles are no longer being touched by the operator; wherein the controller initiates an engine speed reduction mode when the handles have not been touched during the delay period.

15. The material reduction machine of claim 14, further comprising a clutch relay, and wherein the controller is arranged and configured to de-energize the clutch relay at the end of the engine speed reduction mode.

16. The material reduction machine of claim 14, wherein the controller is arranged and configured to exit the engine speed reduction mode if the handles are touched during the delay period.

17. The material reduction machine of claim 14, further comprising a speed sensor operatively connected to an engine driving the material reduction machine, the speed sensor measuring the speed of the engine and the output of the speed sensor being provided to the controller, and wherein the engine speed reduction mode duration varies based on measured speed of the engine at the end of the delay period.

18. The material reduction machine of claim 14, wherein the controller is arranged and configured to enter the engine speed reduction mode if a clutch switch is activated by the operator during a period when the presence of an operator is sensed.

19. The material reduction machine of claim 14, wherein the engine speed reduction mode continues until the speed of the material reduction tool or the engine drops below a predetermined level.

20. A method of automatically decelerating a material reduction tool of a material reduction machine comprising:
   providing an engine running at a first speed engaged with a material reduction tool;
   sensing an event that triggers deceleration of the material reduction tool;
   shutting down the engine until the engine reaches a second speed;
   disengaging the material reduction tool from the engine when the engine reaches the second speed; and
   applying a brake to the material reduction tool after the material reduction tool is disengaged with the engine;
   wherein the second speed is slower than the first speed but sufficiently fast to allow the engine to recover without requiring manually restarting the engine.

21. The method of claim 20, wherein the event that triggers deceleration of the material reduction tool is the absence of an operator for a predetermined period of time.

* * * * *